United States Patent [19]

Gannon et al.

[11] 4,157,586
[45] Jun. 5, 1979

[54] TECHNIQUE FOR PERFORMING PARTIAL STORES IN STORE-THRU MEMORY CONFIGURATION

[75] Inventors: Patrick M. Gannon, Poughkeepsie; Julius D. Jones, Unionvale; Dale M. Junod, Highland; Richard L. Partridge, Wappingers Falls; Thomas R. Wright, Shokan, all of N.Y.

[73] Assignee: International Business Machines Corporation, Armonk, N.Y.

[21] Appl. No.: 794,323

[22] Filed: May 5, 1977

[51] Int. Cl.² .............................................. G06F 7/02
[52] U.S. Cl. .............................................. 364/200
[58] Field of Search ... 364/200 MS File, 900 MS File

[56] References Cited

U.S. PATENT DOCUMENTS

| 3,611,315 | 10/1971 | Murano | 364/200 |
| 3,786,427 | 1/1974 | Schmidt et al. | 445/1 |
| 3,984,818 | 10/1976 | Gnadeberg et al. | 340/172.5 |

*Primary Examiner*—Joseph M. Thesz
*Assistant Examiner*—C. T. Bartz
*Attorney, Agent, or Firm*—James E. Murray

[57] ABSTRACT

This specification relates to performance of partial store operation in a hierarchical memory system which has a buffer store interposed between a processor interrogating the memory system and the main memory of the memory system. Such a partial store operation can be performed on a word of data in the main memory using the buffer store copy of that word of data. The copy of the word of data is read out of the buffer store into a register where it is modified to form a new word by replacing one or more but not all of the bytes in the word of data with bytes supplied by the processor. The new word is then placed in the main memory by performing a full store operation. The problem with performing a partial store operation in this manner is that the copy of the word of data in the buffer store may not be up-to-date. A technique is provided to eliminate the possibility of this old data being rewritten back into the main memory.

4 Claims, 1 Drawing Figure

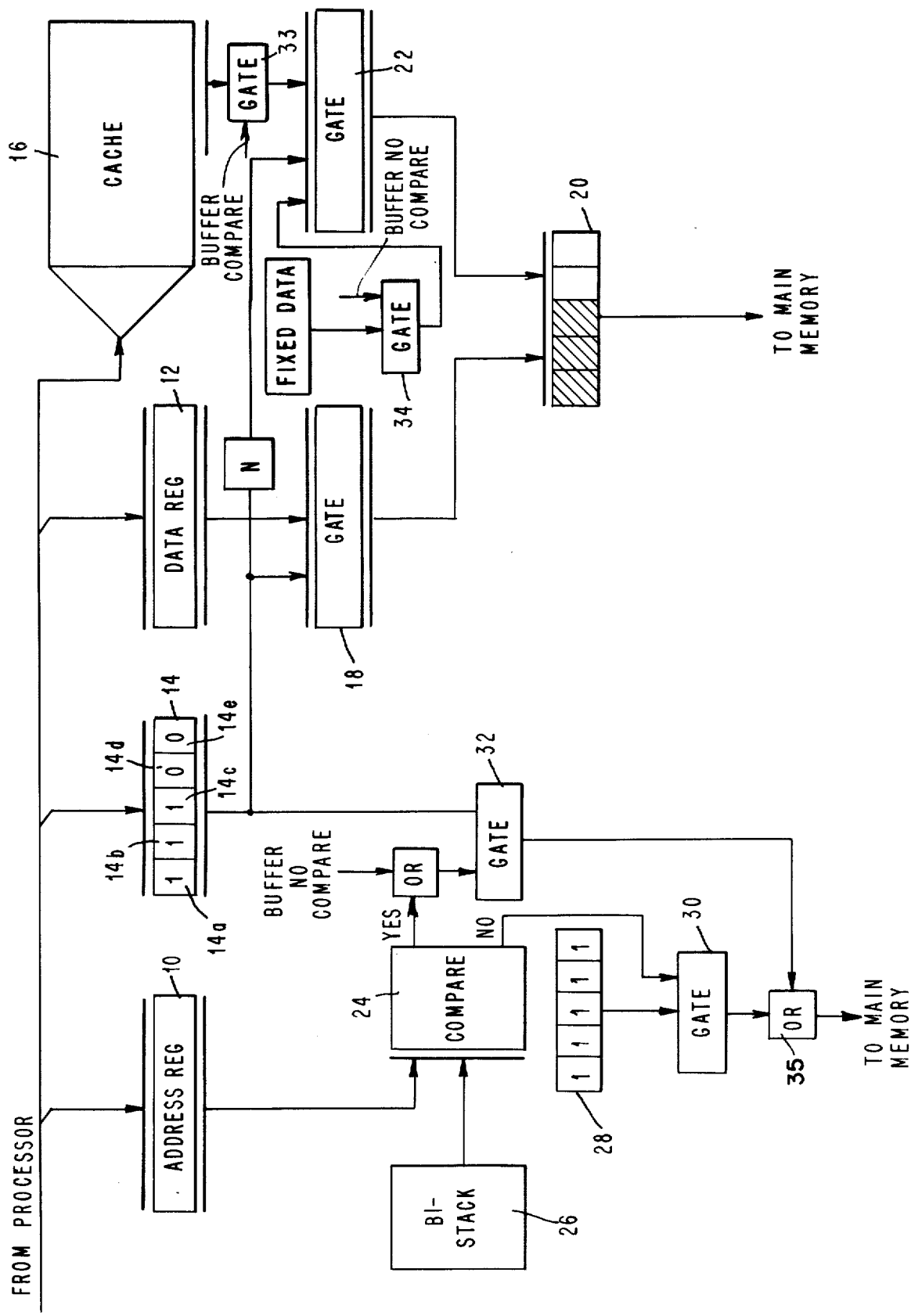

TECHNIQUE FOR PERFORMING PARTIAL STORES IN STORE-THRU MEMORY CONFIGURATION

BACKGROUND OF THE INVENTION

This invention relates to computer storage systems; more particularly it relates to a hierarchical memory system using a store-thru algorithm.

A store-thru algorithm is a technique in which data being written into the memory system by a processor is stored directly into the main memory system without first storing the data into a buffer store or cache interposed between the processor and the main memory and then transferring the data from the cache into the main memory. In such memory systems using a store-thru algorithm, it has been the practice to perform what is called a partial store operation in main memory. A partial store operation is a write operation in which only a portion of the bytes of a word stored in main memory are changed by the write command from the processor. When a partial store operation is to be performed, a number of control bits called marks are transmitted to the main memory with the write command by the processor requesting the partial store operation. There is a mark for each byte in the addressed word of data. If a byte in the word is to be changed by the write operation the mark is "1". If a byte is to remain unchanged by the write operation the mark for that byte is "0". To perform a partial store operation the word of data has to be read out of main storage into a register where the bytes represented by "1" marks are replaced by data supplied by the processor while the bytes represented by "0" marks remain unchanged. The modified word of data in the register is then rewritten back into the main memory.

A system using such a partial store operation can be found in U.S. Pat. No. 3,883,854, filed on Nov. 30, 1973 and entiled, "Interleaved Memory Control Signal And Data Handling Apparatus Using Pipelining Techniques". It can be seen in this patent that it takes longer to perform a partial store in the main memory than it does to perform a full store since the data has to be read out of main memory, modified and rewritten back into main memory. The amount of extra time it takes will vary from one computer system to another; sometimes taking twice as many processor or machine cycles to perform a partial store operation as it does to perform a full store operation. In some computer systems the number of partial stores amounts to at least half the total stores being performed in the memory.

Therefore it can be seen that the performance of partial stores degrades computer performance.

To minimize this degradation it has been suggested in U.S. Pat. No. 3,984,818, filed on Feb. 3, 1975 and entitled, "Paging In Hierarchical Memory Systems" to use the cache to assemble the changed bytes with the unchanged bytes when the word of data being addressed by the partial store operation is in the cache. This is done by interrogating the cache directory to see if the data is in the cache and, if it is, reading the data out of the cache into a register and thereafter using the marks to substitute the changed bits received from the processor. The memory words so assembled are then fed to the main memory and stored using a full store operation.

Assembly of the modified word still has to be performed by this technique. However it is performed at the operating speed of the cache which may be ten times as fast as main memory. The only operation performed at main memory speed is the full store operation. Thus a partial store operation is performed almost as fast as a full store operation using this technique.

THE INVENTION

We have found that the copy of the word of data in the cache may not be up-to-date or in other words may be different from the original in the main memory. This is because the main memory receives write commands from sources other than the cache containing the copy used in making the partial store operation so that changes can be made in the word of data in main memory which will not be reflected in the copy of that word of data in the cache. Therefore it is possible that the use of the copy of data from the cache in a partial store operation will result in rewriting old bytes back in main memory.

In accordance with the present invention, this possibility is eliminated by comparing the main memory address of the data to be changed with addresses where the word of data has been changed by sources other than the particular cache being used in making the partial store operation. If there is a compare the assembly and partial store is not performed in the cache and a partial store operation is performed in the main memory. Of course if the data is not in the cache a partial store operation is performed in the main memory also.

Therefore it is an object of this invention to provide a hierarchical memory with improved partial store performance.

Another object of the present invention is to minimize storage errors in hierarchical memory systems.

A further object of the invention is to provide a fast, accurate means for performing partial store operations in main memory.

THE DRAWING

These and other objects of the invention can be seen in the drawings of which the sole FIGURE is a schematic diagram of apparatus for performing the present invention.

THE EMBODIMENT OF THE INVENTION

The main memory address for a word of data to be stored is received from the processor and placed in an address register 10. Simultaneously the word of data to be stored is placed in the data register 12. With each word transferred into the data register 12, the processor also places control bits into what is referred to as a mark register 14. These control bits are to indicate whether a full or partial store operation is to be performed and if a partial store operation is performed which of the bytes of the word in main memory are to be changed. The bits are either a binary "1" or a binary "0" and each bit represents one byte in the data word. If all of the bits are 1 it indicates that a full store operation is to be performed in main memory. If one or more of the bits are 1 but not all bits 1, it indicates that a partial store operation is to be performed. If a partial store operation is being performed any bit that is 1 indicates that the byte that it represents in main memory is to be changed by the corresponding byte in the word placed in the data register 12 while if the bit is 0 it indicates that the byte of the word it represents in main storage is unchanged by the data placed in the data register 12.

Assume that only the first three bytes of the data word stored in the main memory is to be changed by the data stored in the register 12. Then the bits 14a, 14b, 14c in the mark register 14 will be 1s while bits 14d and 14e will be 0s. These bits control the gating of data from the cache 16 for the processor and from the data register 12. For this purpose, the output of the data register 12 is fed into a set of gates 18 controlled by the contents of the mark register 14. Each of the marks controls one of the bytes in the word read from the data register thus bit 14a controls the first byte, 14b controls the second byte and so on. When any bit is 1 it opens gate 18 for the particular byte which it controls. Thus, in the illustrated embodiment where the first three bits in the register 14 are 1s, the gate 18 would allow the first three bytes of the word stored in the data register 12 to pass through the gate 18 and enter a merge register 20. These three bytes are represented by the hatched boxes in the merge register 20.

The contents of the mark register also control the output of the cache 16 through gates 22. The contents of the cache 16 are fed to the gates 22 along with the complement of the contents of the mark register. The first bit 14a in the mark register 14 controls the gate for the first eight bits in the cache 16. The second bit 14b in the mark register 14 controls the second eight bits in the cache 16 and so on. When the complement of the bit in the mark register is a 1 it allows the byte which it controls to enter the merge register 20 while if it is 0 it prevents the byte from entering the merge register 20. Thus in the case represented in the diagram the two bytes in the cache controlled by the two bits 14d and 14e are passed through to the merge register 20. This is illustrated by the unhatched boxes in the merge register 20. Therefore it can be seen that the word in the merge register 20 is made up of first three bytes of the word read from the data register 12 and the last two bytes of the word read from the cache 16. The output of the merge register 20 is fed to the storage control unit (SCU) for the main memory such as the one described in U.S. Pat. No. 3,883,854.

Marks have to also be transmitted to the SCU described in U.S. Pat. No. 3,883,854 in order for the main memory to properly perform the storage function. For this purpose the output of the address register is fed to a compare circuit 24 where it is compared with the contents of the buffer invalidation stack (bi-stack) 26. The bi-stack 26 contains the real main memory addresses of words of data in the cache 16 that have been written into main memory by remote caches or channels. Thus if an address is in the bi-stack 26 there is a good possibility that the data at that address in main memory will not agree with the copy of that data stored in the cache 16. Furthermore, if any part of the copy of the word of data in the cache 16 were to be written back into main memory at that address it could cause an error condition to exist in the main memory.

Therefore in accordance with the present invention, if it turns out that identity exists between the address in the address register 10 and one of the addresses in the bi-stack 26, then gate 32 is activated allowing the contents of the register 14 to enter the main memory through OR circuit 35 placing the original marks in the main memory. This will mean that the main memory will perform a partial store operation allowing only the bytes in the merge register 20 that came from the data register 12 to be stored in the main memory and preventing any bytes stored in the cache 16 from being re-stored back in main memory.

However if the main memory address in the address register 10 is not found in the bi-stack 26 during the compare operation no compare signal activates gate 30 permitting the output of a stored table 28 to send all "1s" to the SCU of the main memory indicating to the main memory that a full store operation is to be performed. This means that the contents of the merge register 20 including the two bytes from the cache 16 will be written into the main memory in a full store operation.

Up until now, only cases where the addressed word of data was found in the cache 16 have been described. In each of the described cases, the directory for the cache 16 such as the buffer directorys in U.S. Pat. No. 3,828,904, filed July 23, 1974 and entitled "Virtual Memory System" issues a compare signal. This compare signal activates the gate 33 to permit the data from the cache to enter the merge register. If the word of data is not found in the cache, the buffer compare signal will not be produced so that data from the cache will not be able to enter the merge register. Instead the buffer directory will issue a buffer no-compare signal. This no-compare signal gates fixed data with good parity thru gate 34 into the merge register 20 in place of data from the cache 16. The buffer no-compare signal also allows the marks from register 14 to enter the main memory through gate 32 so that the main memory then performs a partial store operation.

While the invention has been particularly shown and described with reference to a preferred embodiment thereof, it will be understood by those skilled in the art that the above and other changes in form and details may be made therein without departing from the spirit and scope of the invention.

What is claimed is:

1. In a hierarchical memory system using a store-thru algorithm in which a full or partial word of data supplied by a processor is generally written in a full or partial store operation respectively, directly into the main memory for the memory system instead of being written through a buffer store which is interposed between the main memory and the processor so as to supply data from the processor to the main memory but which store-thru algorithm sometimes performs partial store operations as a full store operation by reading data bytes out of the buffer store and mixing them with data bytes supplied by the processor to form a new word of data on the basis of control bits supplied by said processor, the improvement in performing such partial store operation comprising:

storage means for storing main memory addresses of data words stored in said buffer store that have been changed in main memory by sources not associated with the buffer store;

comparison means for comparing an address in main memory where a partial store is to be performed with main memory addresses of words stored in said storage means and for generating a compare signal when said address in main memory is the same as an address changed by said sources and a no-compare signal when said address in main memory is not the same as any address changed by said sources;

means responsive to said comparison means for performing a partial store operation in main memory using a word made up of data supplied by the processor and data in main memory when a compare signal is provided by the comparison means; and means responsive to said comparison means for performing a full store operation in main memory with the new word of data when a no-compare signal is provided by the comparison means.

2. The hierarchical memory system of claim 1 including:

control signal means for storing said control bits, one bit representing each byte in a word of memory, one state of the bit indicating the byte it represents will be changed in a partial store operation and the other state of the bit indicating the byte it represents will not be changed in a partial store operation.

3. The hierarchical memory system of claim 2 wherein:

said means for performing a partial store operation in main memory includes means for transmitting the control bits to the main memory when a compare signal is provided by the comparison means, said means for performing a full store operation in main memory includes means for transmitting a substitute set of control bits which indicate a full store operation is to be performed in the main memory when a no-compare signal is provided by the comparison means.

4. The hierarchical memory system of claim 3 including:

merge register means responsive to said control signal means for storing the new word of data for transmitting with the control bits or the substitute set of control bits to the main memory whether a partial or full store operation is being performed in the main memory.

* * * * *